US010075594B2

(12) United States Patent
Moncomble et al.

(10) Patent No.: US 10,075,594 B2
(45) Date of Patent: Sep. 11, 2018

(54) METHOD FOR REDIRECTING A CALL TO AT LEAST ONE MESSAGE DEPOSIT SERVER

(71) Applicant: ORANGE, Paris (FR)

(72) Inventors: Ghislain Moncomble, Plestin les Greves (FR); Bertrand Bouvet, Perros-Guirec (FR)

(73) Assignee: Orange, Paris (FR)

( * ) Notice: Subject to any disclaimer, the term of this patent is extended or adjusted under 35 U.S.C. 154(b) by 140 days.

(21) Appl. No.: 14/882,280

(22) Filed: Oct. 13, 2015

(65) Prior Publication Data
US 2016/0119480 A1 Apr. 28, 2016

(30) Foreign Application Priority Data
Oct. 23, 2014 (FR) ...................................... 14 60192

(51) Int. Cl.
*H04M 3/533* (2006.01)
*H04M 3/54* (2006.01)
*H04M 1/00* (2006.01)

(52) U.S. Cl.
CPC ... *H04M 3/53325* (2013.01); *H04M 3/53308* (2013.01); *H04M 3/545* (2013.01);
(Continued)

(58) Field of Classification Search
CPC .. H04M 3/545; H04M 3/53308; H04M 1/006; H04M 3/53325; H04M 2201/12;
(Continued)

(56) References Cited

U.S. PATENT DOCUMENTS

| 5,533,109 A * | 7/1996 | Baker | H04Q 3/625 |
| | | | 379/201.03 |
| 6,385,446 B2 * | 5/2002 | Palviainen | H04M 3/54 |
| | | | 379/211.02 |

(Continued)

FOREIGN PATENT DOCUMENTS

EP   1118239 B1   7/2006

OTHER PUBLICATIONS

Translation of the French Search Authority Written Opinion from French Application No. FR1460192.

*Primary Examiner* — Lisa Hashem
(74) *Attorney, Agent, or Firm* — Haverstock & Owens LLP

(57) ABSTRACT

The present invention relates to a method for redirecting a call to at least one message deposit server chosen beforehand, when a call being set up is being transferred from a first terminal to a second terminal, the transfer being carried out by means of a first signaling message containing a value representative of a number of transfers of the call, referred to as the "forwarding field", the method being such that it includes the steps of: assigning to the forwarding field of the first signaling message a first value greater than or equal to a threshold, the threshold corresponding to a value starting from which the transfer of a call is not allowed by the network; transmitting the first signaling message to the second terminal; and upon receiving a message indicating a failure to set up the call with the second terminal in response to the first signaling message, assigning to the forwarding field of a second signaling message a second value less than the threshold; and transmitting the second signaling message to the at least one chosen deposit server. The invention also relates to a server and a terminal comprising a device (Continued)

Figure 1:
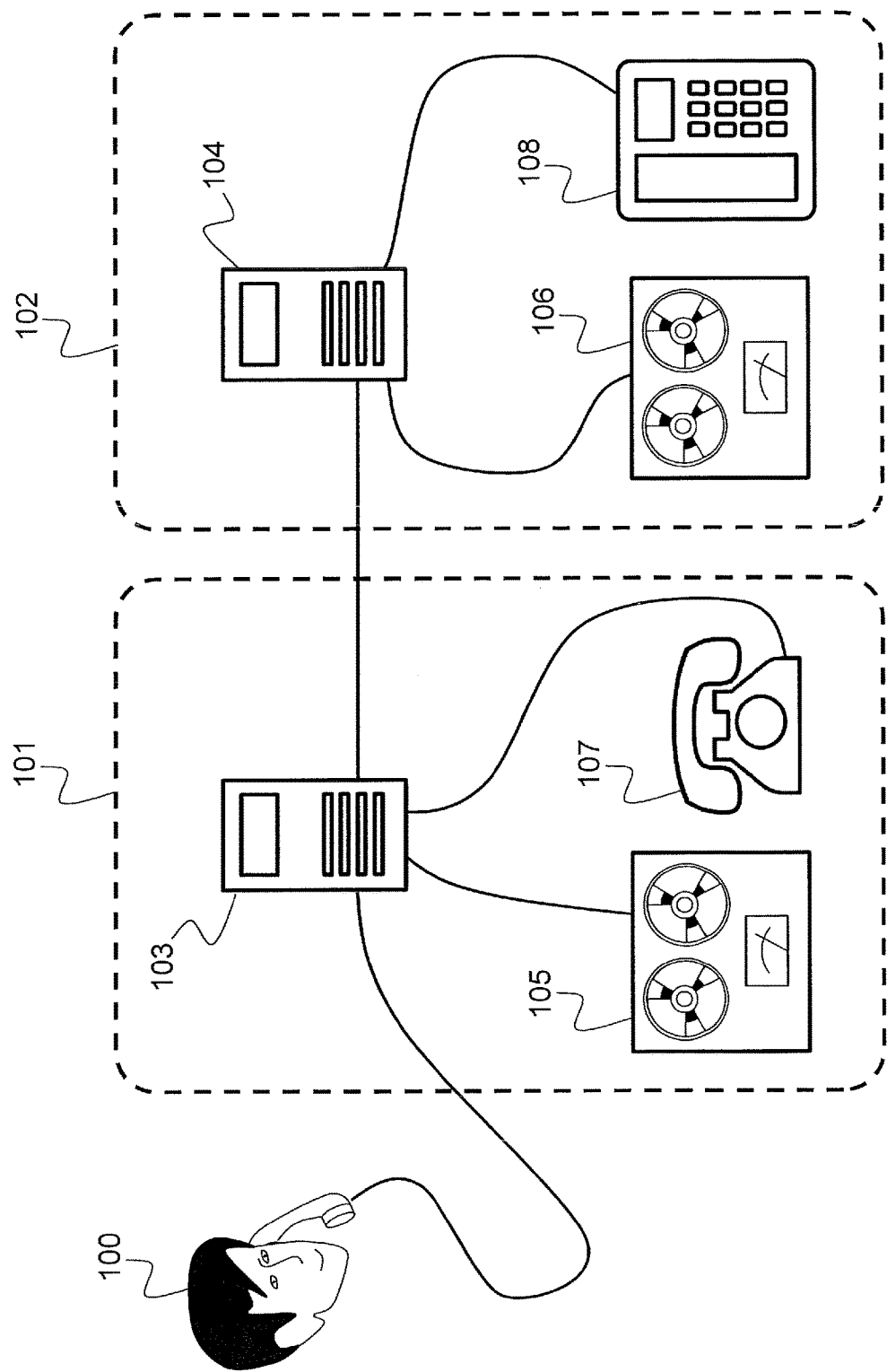

suitable for implementing the method according to the invention.

8 Claims, 4 Drawing Sheets

(52) U.S. Cl.
CPC ........ *H04M 1/006* (2013.01); *H04M 2201/12* (2013.01); *H04M 2201/18* (2013.01); *H04Q 2213/13282* (2013.01)

(58) Field of Classification Search
CPC .... H04M 2201/18; H04Q 2213/13282; H04W 4/16; H04L 67/327; H04L 45/74
See application file for complete search history.

(56) References Cited

U.S. PATENT DOCUMENTS

| | | | | |
|---|---|---|---|---|
| 6,633,768 | B2 * | 10/2003 | Hurme | H04W 8/18 455/406 |
| 6,697,475 | B1 * | 2/2004 | MeLampy | H04Q 3/0016 370/259 |
| 7,142,657 | B2 * | 11/2006 | Woodson | H04M 3/545 379/211.01 |
| 7,460,657 | B1 * | 12/2008 | Baeza | H04M 3/548 379/211.02 |
| 2003/0194994 | A1 * | 10/2003 | Svedberg | H04W 76/04 455/417 |
| 2005/0111649 | A1 | 5/2005 | Belkin et al. | |
| 2007/0183395 | A1 * | 8/2007 | Balyan | H04W 8/04 370/352 |
| 2008/0084980 | A1 * | 4/2008 | Florkey | H04M 3/53316 379/201.01 |
| 2011/0164534 | A1 * | 7/2011 | Vaishnavi | H04L 29/06027 370/259 |
| 2012/0113978 | A1 * | 5/2012 | Cerami | H04M 1/2535 370/352 |
| 2013/0065561 | A1 * | 3/2013 | Eichen | H04W 4/16 455/413 |
| 2013/0251116 | A1 * | 9/2013 | Kumar K.A. | H04M 3/54 379/67.1 |
| 2013/0251123 | A1 * | 9/2013 | Tirunagari | H04M 3/533 379/88.22 |
| 2013/0329734 | A1 * | 12/2013 | Chesla | H04L 45/74 370/392 |
| 2015/0237198 | A1 * | 8/2015 | Bouvet | H04M 3/2218 370/259 |
| 2017/0034355 | A1 * | 2/2017 | Kamat | H04M 3/53333 |
| 2017/0250849 | A1 * | 8/2017 | Cerami | H04L 29/06224 |

\* cited by examiner

METHOD FOR REDIRECTING A CALL TO AT LEAST ONE MESSAGE DEPOSIT SERVER

TECHNICAL FIELD

The invention relates to the field of telecommunications and in particular concerns the transfer of calls to a messaging system.

PRIOR ART

Call transfer (or call forwarding) and voice messaging are very popular communication services.

Call transfer is a service providing for the presentation of a telephone call to a second terminal when the call does not complete on a first terminal. Conventionally, a user can configure a call forwarding on a fixed line in such a way that calls to this fixed line are presented, for example, on a cell phone. Call forwarding is transparent to the calling party. The number of the line to which a call is to be forwarded can be configured by the owner of the line on which the forwarding is configured. Generally, this configuration is carried out via a configuration tool which can be a voice server, a web server or combinations of keys to operate on the terminal itself.

Conventionally, when a call presented on a particular line does not complete, the call is redirected to a voice messaging system. The calling user can thus deposit a message which will be able to be picked up later by the owner of the line.

These services are very widespread and have proved to be popular with users. However, the combined usage of call transfer and voice messaging poses problems which today are only partly solved. In particular, when a transferred call does not complete, it is redirected to the voice messaging system associated with the line onto which the call has been transferred and not to the voice messaging system associated with the line indicated by the calling party.

The messaging system to which a transferred call is redirected is thus selected automatically, according to technical constraints, while in a number of cases it would be desirable that the user for whom the call is intended can select the voice messaging system in which messages intended for him/her will be deposited.

U.S. Pat. No. 8,027,450 B2 describes a method for selecting a voice messaging system following a call transfer. This method proposes selecting a voice mailbox on the basis of the line on which the forwarding has been configured and the line to which the forwarding is configured. Despite all the benefit that this invention exhibits, its implementation requires the underlying network to be adapted. In particular, this solution does not function when a subscriber of a first telecommunications operator, the network of which is adapted to implement this method, configures a forwarding to a line hosted by a second operator, the network of which is not adapted to implement the method.

Therefore, there exists a need for a solution providing for the selection of a messaging system to which a transferred call is to be redirected, which does not require particular adaptation in the telecommunications network hosting the line onto which the call is transferred.

SUMMARY OF THE INVENTION

To this end, the present invention relates to a method for redirecting a call to at least one message deposit server chosen beforehand, when a call being set up is being transferred from a first terminal to a second terminal, the transfer being carried out by means of a first signaling message containing a value representative of a number of transfers of the call, referred to as the "forwarding field", the method being such that it includes the following steps:

assigning to the forwarding field of the first signaling message a first value greater than or equal to a threshold, the threshold corresponding to a value starting from which the transfer of a call is not allowed by the network, transmitting the first signaling message to the second terminal, and upon receiving a message indicating a failure to set up the call with the second terminal in response to the first signaling message:

assigning to the forwarding field of a second signaling message a second value less than the threshold, and transmitting the second signaling message to the at least one chosen deposit server.

In the following description, the terms "transfer", "forwarding" or "redirection" of a call are equivalent and in particular relate to the setup phase of the call. When a call transfer is configured on a first telephone line for example, calls that are unanswered or rejected on this line are redirected in order to be presented on a second line nominated when the transfer is configured.

Conventionally, telecommunications standards use a forwarding field associated with the call setup messages when a transfer is configured on a line. This field is incremented upon each transfer from one line to another. By monitoring the value of this field during each transfer, communication network operators can ensure that the number of transfers of a call does not exceed a maximum threshold. In particular, monitoring the number of transfers of a call provides for avoiding a loop when a first line is forwarded onto a second line even while a forwarding is configured on the second line to the first line.

When the first signaling message containing a value of the forwarding field that is greater than or equal to a predetermined threshold is sent, this gives rise to an error when the call cannot complete, for example in the case of an unanswered or rejected call. Specifically, since the forwarding field is set at a value greater than or equal to the maximum number of transfers allowed, the call cannot be redirected to the messaging system associated with the line to which the call is transferred. Thus, upon reception of an error in response to the call setup attempt, the method proposes transmitting a signaling message to the messaging system associated with the line to which the call was intended before the transfer, this message containing a forwarding field, the value of which is set at a value less than the maximum number of transfers allowed by the network for a call.

The method thus allows a user to select the deposit server in which the messages will be recorded in the event of a failure of a call when a call transfer has been configured. In a particularly advantageous manner, the method does not require that the network bearing the line to which the call is transferred be adapted in order to implement the invention.

According to a particular embodiment, the method is such that the error message in response to the first signaling message contains an indication relating to the cause of the error and such that the at least one deposit server to which the second signaling message is transmitted is chosen according to the cause of the error.

It is thus possible for a user to configure the messaging system in which a message will be deposited according to the reason for which a call has not been able to be set up. For example, a caller can be placed in communication with a first voice messaging system in the event that their call is not answered on the line to which the forwarding is configured and placed in communication with a second voice messaging system in the event that the call is rejected.

According to a particular embodiment, the method is such that it additionally includes, when the message indicating the failure to set up the call with the second terminal includes an indication according to which the call is set up with a message deposit server, a step for transmitting a message for canceling the call intended for the message deposit server.

When the network bearing the line to which a call is redirected does not take into account the value of the forwarding field, the call is set up to the messaging system associated with this line and a call setup message containing an item of information indicating that the call is set up with a messaging system is sent. The method then proposes transmitting a message for canceling the call with the messaging system before setting up a new call with the messaging system chosen during a previous configuration operation. Thus, the method ensures that the messages are correctly deposited on the chosen messaging system.

According to another aspect, the invention relates to a device for redirecting a call to at least one message deposit server chosen beforehand, when a call being set up is being transferred from a first terminal to a second terminal, the transfer being carried out by means of a first signaling message containing a value representative of number of transfers of the call, referred to as the forwarding field, the device being characterized in that it includes:
- a counter suitable for assigning a first value greater than or equal to a threshold to the forwarding field of the first signaling message, the threshold corresponding to a value starting from which the transfer of a call is not allowed by the network,
- a communication module suitable for transmitting the first signaling message to the second terminal, the counter and the communication module being operated upon receiving a message indicating a failure to set up the call with the second terminal in response to the first signaling message in order to:
- assign a second value less than the predetermined threshold to a forwarding field of a second signaling message, and
- transmit the second signaling message to the at least one chosen deposit server.

The invention relates also to a terminal characterized in that it includes a redirection device as described above.

The invention relates also to a server characterized in that it includes a redirection device as described above.

The invention relates also to a computer program including instructions for executing the redirection method, when the program is executed by a processor.

The invention relates also to a storage medium readable by a computer on which there is recorded a computer program comprising instructions for executing the steps of the redirection method.

The terminals, servers, devices, programs and storage media exhibit advantages similar to those of the corresponding method described above.

LIST OF FIGURES

Figure 2:
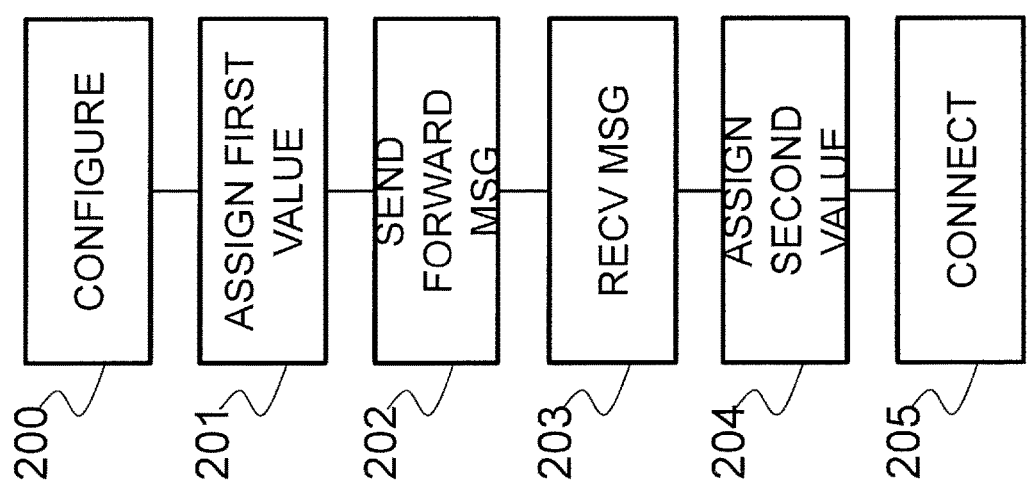
Figure 3:
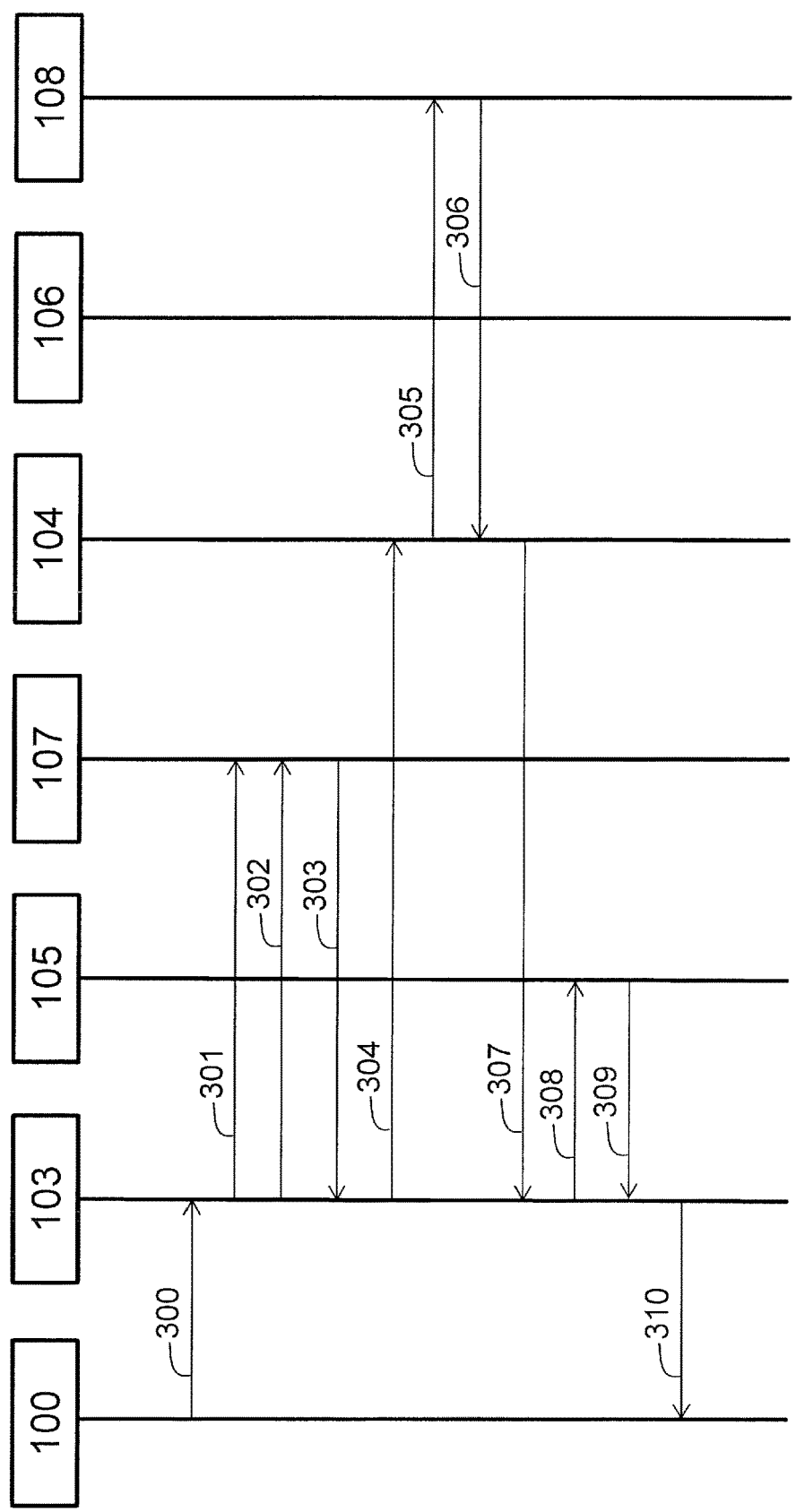
Figure 4:
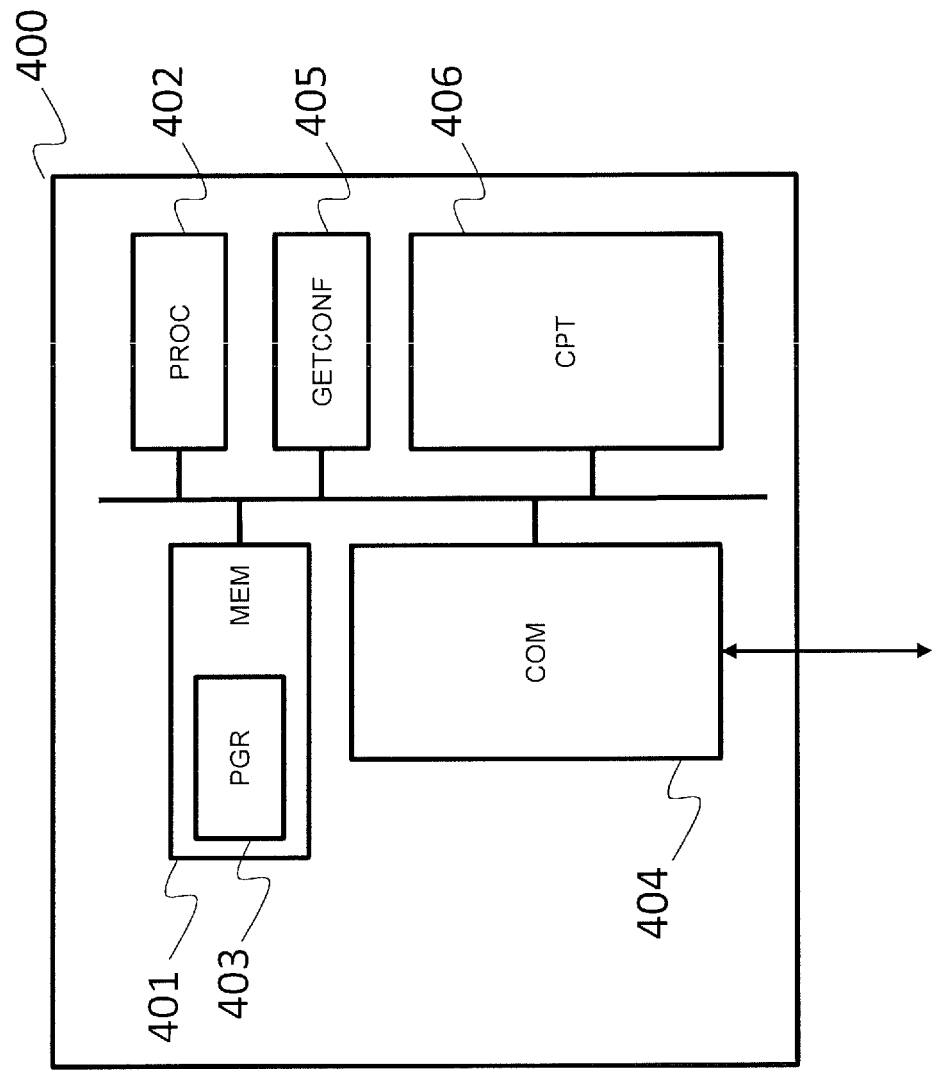

Other advantages and features of the invention will become clearer upon reading the following description of a particular embodiment of the invention, which embodiment is given by way of illustrative and nonlimiting example, and from the appended drawings in which:

FIG. 1 illustrates a simplified architecture of a telecommunications network adapted to implement the invention according to a particular embodiment, FIG. 2 illustrates the main steps of the redirection method according to a particular embodiment, FIG. 3 illustrates a timing diagram on which there are represented messages able to be exchanged in a particular implementation of the invention, FIG. 4 illustrates a simplified architecture of a device adapted to implement the redirection method according to a particular embodiment.

DETAILED DESCRIPTION

FIG. 1 represents two telecommunications networks 101 and 102 belonging for example to separate operators and comprising application servers 103 and 104 respectively, taking charge of calls within the network to which they belong.

The representation of the networks 101 and 102 is deliberately simplified in order to facilitate the understanding of the invention. However, a person skilled in the art is aware that the telecommunications networks can comprise numerous items of equipment and that the implementation of the invention under real production conditions can require a distribution of functions over various items of equipment. Although this description is based on the example of a telephone call transfer, the invention can be applied to other types of communications, such as for example an instant messaging communication in which servers referred to as "store and forward" are adapted to store received messages offline.

In this example embodiment, the networks 101 and 102 are separate IMS (IP Multimedia Subsystem) telecommunications networks and comprise, in addition to the application servers 103 and 104, message deposit servers 105 and 106 suitable for recording and storing voice messages intended for subscribers to the network. These are for example voice messaging system servers allowing callers to deposit voice messages intended for a subscriber to the network when a call does not complete because the subscriber is away or because the line is busy for example.

Thus, when a user 100 puts through a telephone call intended for a subscriber 107 of the network 101 and when the latter does not answer, the application server 103 can cancel the presentation of the call and redirect the call to a voice mailbox associated with the subscriber 107 hosted on the messaging server 105. The user 100 can thus record a message which will be read later by the subscriber 107. This redirection of the call to the messaging system can be carried out conventionally within an IMS network by sending a CANCEL SIP (Session Initiation Protocol) message to the terminal of the subscriber 107, and then an INVITE message transmitted to the messaging server 105.

In addition to forwarding calls to the messaging server 105, the server 103 supports a call forwarding service offering the option to subscribers of the network 101 to forward calls to another line. For example, the holder of the line 107 can configure a forwarding on no answer to the line 108. Thus, when a user 100 puts through a telephone call to a subscriber 107 of the network 101 and when the latter does not answer, the application server 103 can cancel the presentation of the call on the line 107 and present the call on the line 108. The forwarding is configured conventionally via a configuration interface accessible from the Internet network or a voice server for example. In this example, although the line to which the forwarding is configured can also be operated by the same operator as the line 107, it belongs in this case to a telecommunications network 102 operated by an operator that is different from the operator of the network 101.

When the call is thus transferred to the line 108 and when the called party does not answer, the application server 104 conventionally redirects the call to the message deposit server 106 of the network 102 in order that the calling party can leave a message. The calling party is then invited to deposit a message on the messaging system associated with the line 108 while he/she was trying to reach the line 107.

The invention seeks to avoid this automatic redirection to the messaging system 106 in order to allow a redirection to the messaging system 105 without having to modify the items of the network 102.

FIG. 2 illustrates the main steps of the method for redirecting a call to a message deposit server chosen beforehand. During a preliminary step 200, a user of the line 107 configures a call forwarding in such a way that the calls presented on the line 107 are automatically transferred onto the line 108, the forwarding thus configured able to be conditional or unconditional. To this end, the user of the line 107 connects for example to a web portal associated with the line in order to enter the contact data of a second line to which incoming calls are to be redirected. Other configuration means can also be implemented to carry out the configuration, such as for example a voice-based service, an interface integrated with the terminal or a combination of keys pressed successively on the keypad of the terminal. According to a particular embodiment, these configuration means additionally provide for selecting a voice messaging system to which calls are to be redirected in the event of no answer on the transferred line. This can be for example a configuration option inviting the user to nominate the messaging system of the line 107 or the messaging system associated with the line 108 when a call does not complete on the line 108. According to a particular embodiment, a messaging system is chosen in association with a reason for the failure to set up a call. Thus, the user can configure for example a forwarding to the messaging system 105 in the event of no answer on the line 108 and a forwarding to the messaging system 106 in the event of a deliberate rejection of a call on this same line. According to a particular embodiment, the configuration step provides for the nomination of several messaging systems on which messages are recorded simultaneously. For example, a user can select the messaging system of the line 107 and the messaging system of the line 108 in such a way that in the event of no answer, a voice message can be recorded on both messaging systems simultaneously. At the end of the configuration step, the information relating to the nomination of at least one message deposit server is recorded and stored, for example in a memory of the server 103. This stored information corresponds to an identifier of the messaging server and allows a call to be set up with the server. This can be for example an IP address, a telephone number, a URL and/or an identification code of a subscriber.

Step 201 relates to the preparation of a signaling message suitable for redirecting the call to another line when a call cannot be set up on the first line. The signaling message contains a forwarding field, providing for counting the number of successful forwards for a call. Step 201 includes in particular the assignment of a first value greater than or equal to a threshold on this forwarding field, the threshold corresponding to a value starting from which the transfer of a call is not allowed by the network. For example, in the case of an IMS network, this can be an INVITE message containing a "diversion" field in which a forwarding field is set at a value greater than or equal to the maximum number of forwards allowed by the network. According to a particular embodiment of the invention, this first predetermined value is equal to 5. In the case of a PSTN network, the SS7 (Signaling System 7) protocol also specifies the use of a redirection counter. The ITU and ANSI standards specify a maximum value of 5 for this counter, thereby forming a particularly beneficial value for the invention. Thus, by setting the value of the counter to a value of 5 on a network implementing the SS7 protocol, it is ensured that the call will not be able to be redirected.

A step 202 concerns the transmission of the signaling message prepared at step 201 to the second terminal so as to cause the transfer of the call to a line nominated by the user when the forwarding was being configured.

A step 203 relates to the reception of a message indicating a failure to set up the call with the second terminal in response to the signaling message transmitted at the previous step. For example, in an IMS network, an error message is sent in response to an INVITE connection request when the call cannot complete. For example, if a call is rejected by the called party or if the line is busy, the calling party can receive "603—decline" or "486—Busy here" responses respectively. These messages indicate that the call has not been able to complete and specify the reason for the failure. Other error codes can be returned according to the circumstances. Generally, "error message" is understood here to mean the reception of an item of information relating to a failure to set up the call with the called party.

The message indicating the failure to set up the call can be a message confirming that the call is set up with a voice messaging system. For example, when a call forwarding is configured to a line belonging to a telecommunications network that does not take into account the forwarding field populated in the initial signaling message, the call can be redirected to the messaging server associated with the line to which the call is forwarded. In the case of an IMS network, this confirmation message is a "200—OK" response to the INVITE message for setting up the call and includes an indication relating to the fact that the call is set up with automatic network equipment such as a messaging server. This indication is for example an "automata" parameter as defined in the IETF standard RFC 3840. According to a particular embodiment, when such a message is received at step 203 and when the configuration performed at step 200 nominates a messaging system other than the messaging system associated with the line to which the forwarding is configured, the call with the messaging server is terminated by the sending of a message suitable for canceling the setting-up of the call. For example, in the case of an IMS network, a CANCEL message can be sent to the server to cancel the setting-up of the call.

Step 204 concerns the preparation of a signaling message suitable for redirecting the call to a messaging system when a call cannot be set up on the line to which the call has been redirected. The preparation of the message entails in particular assigning to a forwarding field a value less than a predetermined threshold starting from which forwards are not allowed by the network. For example, this step can, in an IMS network, entail assigning the value 1 to the forwarding field in a "diversion" field of an INVITE message.

At a step 205, the signaling message prepared at step 204 is transmitted to at least one message deposit server associated with the line on which the forwarding has been configured. According to a particular embodiment, this step comprises first obtaining an identifier of at least one messaging server stored during the previous step for configuring the forwarding as described at step 200.

According to a particular embodiment, when an item of information relating to the cause of the failure to set up the call is indicated in the error message received at step 203, this can be used to select the message deposit server to which the call is to be redirected. For example, the user may have chosen, during the configuration step 200, a first message deposit server associated with a first cause of failure to set up the call (for example, a call rejection) and a second server associated with a second cause of failure to set up the call (such as a busy line). Thus, in the case of an IMS network, upon receiving a "603—decline" error message, it is the identifier of the first deposit server which is used to transmit the message, while upon receiving a "486—Busy here" message, it is the identifier of the second deposit server which is used.

Reference is now made to FIG. 3 which represents a timing diagram on which there are illustrated messages able to be exchanged between the various entities described with reference to FIG. 1 in order to implement the method. For the sake of clarity, only the messages required to clearly understand the invention are represented, but a person skilled in the art is aware that an implementation in a real environment may require additional message exchanges.

When the user 100 initiates a call to the line 107, a first message 300 is transmitted to the application server 103. This is for example an INVITE SIP message conventionally containing the contact data of the calling party and of the called party and information describing characteristics of the desired call. This message is handled by the application server which retransmits a corresponding INVITE message 301 to the terminal associated with the line 107, thus causing the presentation of the call on the terminal.

Upon expiry of a predetermined time period, the application server cancels the presentation of the call on the line 107 by transmitting for example a CANCEL SIP message 302, 30 seconds after the start of the presentation of the call. The terminal associated with the line 107 then transmits a message 303 to the application server confirming the end of the presentation of the call. This can be for example a "487—Request terminated" SIP response to the CANCEL message.

At this stage, when the presentation of the call is stopped on the terminal associated with the line 107 and when the application server has been informed of this, the latter can consult the configuration relating to the call forwardings on the line 107, carried out and stored beforehand during step 200. Thus, when a call transfer has been configured on the line 107 and when the message deposit server chosen during the prior configuration operation is the voice messaging system associated with the line 107, the application server prepares a signaling message suitable for redirecting the call onto the terminal associated with the line 108. This can be for example an INVITE SIP message indicating the contact data of the calling party 100 and the contact data of the destination line 108 and containing a "diversion" field as described in the IETF standard RFC 5806, indicating the contact data of the forwarded line 107 and a forwarding field.

According to a particular embodiment of the invention, the application server assigns to the forwarding field in the signaling message a first value greater than or equal to a threshold, the threshold corresponding to a value starting from which the transfer of a call is not allowed by the network. Conventionally, in order to prevent loops caused by circular forwarding arrangements, network operators often fix the predetermined threshold at 2. In this example, the application server sets a value much higher than the predetermined threshold, such as for example a value of 5 which is the maximum value permitted by the SS7 protocol.

At step 202, the signaling message prepared at step 201 and containing a forwarding field, the value of which is suitable for preventing further forwardings of the call, is transmitted to the line 108. This can be for example the message 304 represented in FIG. 3. The message can be intercepted by at least one item of intermediate equipment, such as for example the application server 104 of the network 102 and retransmitted in the form of a message 305 to the terminal associated with the line 108. The terminal associated with the line 108 can then present the call which was initially intended for the line 107.

If the call is not answered on the terminal associated with the line 108, for example if the called party rejects the call, an error message denoted by 306 in FIG. 3 can be sent by the terminal in response to the signaling message 305 and be received by the application server 104. This can be for example a "603—Decline" SIP response to the INVITE message used to set up the call. Since the value of the forwarding field has been set by the application server 103 at a value that is incompatible with an additional forwarding, the application server 104 cannot redirect the call in the conventional way to the messaging server 106. The application server 104 then retransmits the error message to the application server 103 in the form of a message 307 containing an indication that the called party did not answer. This message 307 can be for example a "603—Decline" SIP response to the INVITE message 304 transmitted by the server 103 to the server 104.

Upon receiving during a step 203 the message 307 indicating that the called party to whom the call was transferred did not answer, the server 103 consults the configuration recorded at step 200, when the call transfer was being set on the line 107, in order to identify the messaging system to which the call is to be redirected. The application server 103 then prepares a signaling message 308 suitable for redirecting the call to the messaging system chosen in the configuration, such as for example the messaging system associated with the line 107. The message can for example be prepared from the message 304 by modifying the contact data of the recipient in such a way that it nominates the messaging server 105. This can for example be an INVITE SIP message containing a "diversion" field as defined in RFC 5806. During this step, the application server 103 assigns a new value to the forwarding field contained in the message, this new value being less than the predetermined threshold starting from which the network does not allow the redirection of calls. For example, in the case of an operator network in which a maximum of two call redirections are allowed for the same call, the server can assign a value equal to 1 to the forwarding field so as to allow a redirection to another destination, and in particular to the messaging system 105.

This second signaling message 308 is then sent to the messaging server 105 at step 205 in order that the calling party 100 is placed in communication with the messaging system 105 associated with the line 107 in order to record a message there. When the messaging server 105 accepts the call, confirmation messages 309 and 310, such as for example "200—OK" SIP responses, are transmitted to the terminal of the user 100 in order to finalize the connecting-up process.

Thus, the method according to the invention, implemented on the application server 103, provides for placing a calling party 100 in communication with a message deposit server 105 associated with a first line 107 of the first operator network 101 when a call that is redirected to a second line 108 of a second operator network 102 cannot complete. The method is particularly advantageous since the operator of the network 101 can offer its subscribers the option to choose the messaging system to which calls are to be redirected during a call transfer even when the call is transferred to a network operated by a third party and not offering the same service.

FIG. 4 illustrates in a simplified manner the architecture of a device 400 suitable for implementing the invention. The device comprises a storage space 401, for example a memory MEM, and a processing unit 402 equipped for example with a processor PROC. The processing unit can be driven by a program 403, for example a computer program PGR, implementing the redirection method as described in the invention with reference to FIG. 2, and notably the steps of: assigning to the forwarding field of the first signaling message a first value greater than or equal to a threshold, the threshold corresponding to a value starting from which the transfer of a call is not allowed by the network; transmitting the first signaling message to the second terminal; and upon receiving a message indicating a failure to set up the call with the second terminal in response to the first signaling message, assigning to the forwarding field of a second signaling message a second value less than the threshold; and transmitting the second signaling message to the at least one deposit server chosen during a prior configuration step.

Upon initialization, the instructions of the computer program 403 are for example loaded into a RAM (Random Access Memory) memory before being executed by the processor of the processing unit 402. The processor of the processing unit 402 implements the steps of the redirection method according to the instructions of the computer program 403.

For this purpose, the device comprises, in addition to the memory 401, a communication module 404 (COM) allowing the device to connect to a communication network and exchange data with other devices through this telecommunications network, and for example to obtain, from a database, a message deposit server identifier, to transmit and receive signaling messages for setting up and transferring calls. In particular, a communication module is suitable for transmitting a first signaling message to a terminal, receiving a message indicating a failure to set up the call and for transmitting a second signaling message to at least one message deposit server chosen beforehand. This communication module can for example be a Wi-Fi or Ethernet network interface. The device also comprises a module 405 (GETCONF) for the obtaining of a configuration, set up beforehand, of a call forwarding, the module notably providing for the obtaining of an identifier of at least one message deposit server chosen beforehand. This module can be, for example, an HTTP client suitable for making a request to a database storing the configuration. The device also comprises a counter 406 (CPT) suitable for assigning a first value greater than or equal to a threshold to the forwarding field of the first signaling message, and for assigning a second value less than the predetermined threshold to a forwarding field of a second signaling message, the threshold corresponding to a value starting from which the transfer of a call is not allowed by the network. This module is notably used to prepare signaling messages providing for control of the forwarding of a call to another line.

According to a particular embodiment, the device can be integrated in an application server of a telecommunications network or a terminal, and generally in any equipment connected to a communication network suitable for receiving and transmitting call signaling messages.

The invention claimed is:

1. A method for redirecting a call in a telecommunication network to at least one message deposit server chosen beforehand, when a call being set up is being transferred from a first terminal to a second terminal, the transfer being carried out by means of a first signaling message containing a value representative of a number of transfers of the call, referred to as a "forwarding field", the method comprising:
avoiding forwarding of the call to a first message deposit server by assigning to the forwarding field of the first signaling message a first value greater than or equal to a threshold, regardless a current value of the forwarding field, the threshold corresponding to a value starting from which the transfer of a call is not allowed by the network;
transmitting the first signaling message to the second terminal;
upon receiving a message indicating a failure to set up the call with the second terminal in response to the first signaling message:
assigning to a forwarding field of a second signaling message a second value less than the threshold; and
transmitting the second signaling message to the at least one chosen message deposit server.

2. The method according to claim 1, wherein the message indicating a failure to set up the call in response to the first signaling message contains an indication relating to a cause of the failure and in that the at least one deposit server to which the second signaling message is transmitted is chosen according to the cause of the failure.

3. The method according to claim 1, wherein the method additionally includes, when the message indicating the failure to set up the call with the second terminal contains an indication according to which the call is set up with a message deposit server associated with the second terminal, transmitting a message for canceling the call intended for the message deposit server associated with the second terminal.

4. The method according to claim 2, wherein the method additionally includes, when the message indicating the failure to set up the call with the second terminal contains an indication according to which the call is set up with a message deposit server associated with the second terminal, transmitting a message for canceling the call intended for the message deposit server associated with the second terminal.

5. A device for redirecting a call in a telecommunication network to at least one message deposit server chosen beforehand, when a call being set up is being transferred from a first terminal to a second terminal, the transfer being carried out by means of a first signaling message containing a value representative of a number of transfers of the call, referred to as a "forwarding field", the device comprising:
a counter suitable for avoiding forwarding of the call to a first message deposit server by assigning a first value greater than or equal to a threshold to the forwarding field of the first signaling message, regardless a current value of the forwarding field, the threshold corresponding to a value starting from which the transfer of a call is not allowed by the network;

a communication module suitable for transmitting the first signaling message to the second terminal;

upon receiving a message indicating a failure to set up the call with the second terminal in response to the first signaling message, the counter and the communication module being operated in order to:

assign a second value less than the threshold to a forwarding field of a second signaling message; and transmitting the second signaling message to the at least one chosen message deposit server.

6. A terminal including a redirection device for redirecting a call in a telecommunication network to at least one message deposit server chosen beforehand, when a call being set up is being transferred from a first terminal to a second terminal, the transfer being carried out by means of a first signaling message containing a value representative of a number of transfers of the call, referred to as a "forwarding field", the device being characterized in that it includes:

a counter suitable for avoiding forwarding of the call to a first message deposit server by assigning a first value greater than or equal to a threshold to the forwarding field of the first signaling message, regardless a current value of the forwarding field, the threshold corresponding to a value starting from which the transfer of a call is not allowed by the network;

a communication module suitable for transmitting the first signaling message to the second terminal;

upon receiving a message indicating a failure to set up the call with the second terminal in response to the first signaling message, the counter and the communication module being operated in order to:

assign a second value less than the threshold to a forwarding field of a second signaling message; and transmitting the second signaling message to the at least one chosen message deposit server.

7. A server including a redirection device for redirecting a call in a telecommunication network to at least one message deposit server chosen beforehand, when a call being set up is being transferred from a first terminal to a second terminal, the transfer being carried out by means of a first signaling message containing a value representative of a number of transfers of the call, referred to as a "forwarding field", the device being characterized in that it includes:

a counter suitable for avoiding forwarding of the call to a first message deposit server by assigning a first value greater than or equal to a threshold to the forwarding field of the first signaling message, regardless a current value of the forwarding field, the threshold corresponding to a value starting from which the transfer of a call is not allowed by the network;

a communication module suitable for transmitting the first signaling message to the second terminal;

upon receiving a message indicating a failure to set up the call with the second terminal in response to the first signaling message, the counter and the communication module being operated in order to:

assign a second value less than the threshold to a forwarding field of a second signaling message; and transmitting the second signaling message to the at least one chosen message deposit server.

8. A non-transitory computer-readable recording readable by a computer on which there is recorded a computer program comprising instructions for executing a method for redirecting a call in a telecommunication network to at least one message deposit server chosen beforehand, when a call being set up is being transferred from a first terminal to a second terminal, the transfer being carried out by means of a first signaling message containing a value representative of a number of transfers of the call, referred to as a "forwarding field", the method being characterized in that it includes the following steps:

avoiding forwarding of the call to a first message deposit server by assigning to the forwarding field of the first signaling message a first value greater than or equal to a threshold, regardless a current value of the forwarding field, the threshold corresponding to a value starting from which the transfer of a call is not allowed by the network;

transmitting the first signaling message to the second terminal;

upon receiving a message indicating a failure to set up the call with the second terminal in response to the first signaling message:

assigning to a forwarding field of a second signaling message a second value less than the threshold; and transmitting the second signaling message to the at least one chosen message deposit server.

* * * * *